United States Patent Office 2,919,562
Patented Jan. 5, 1960

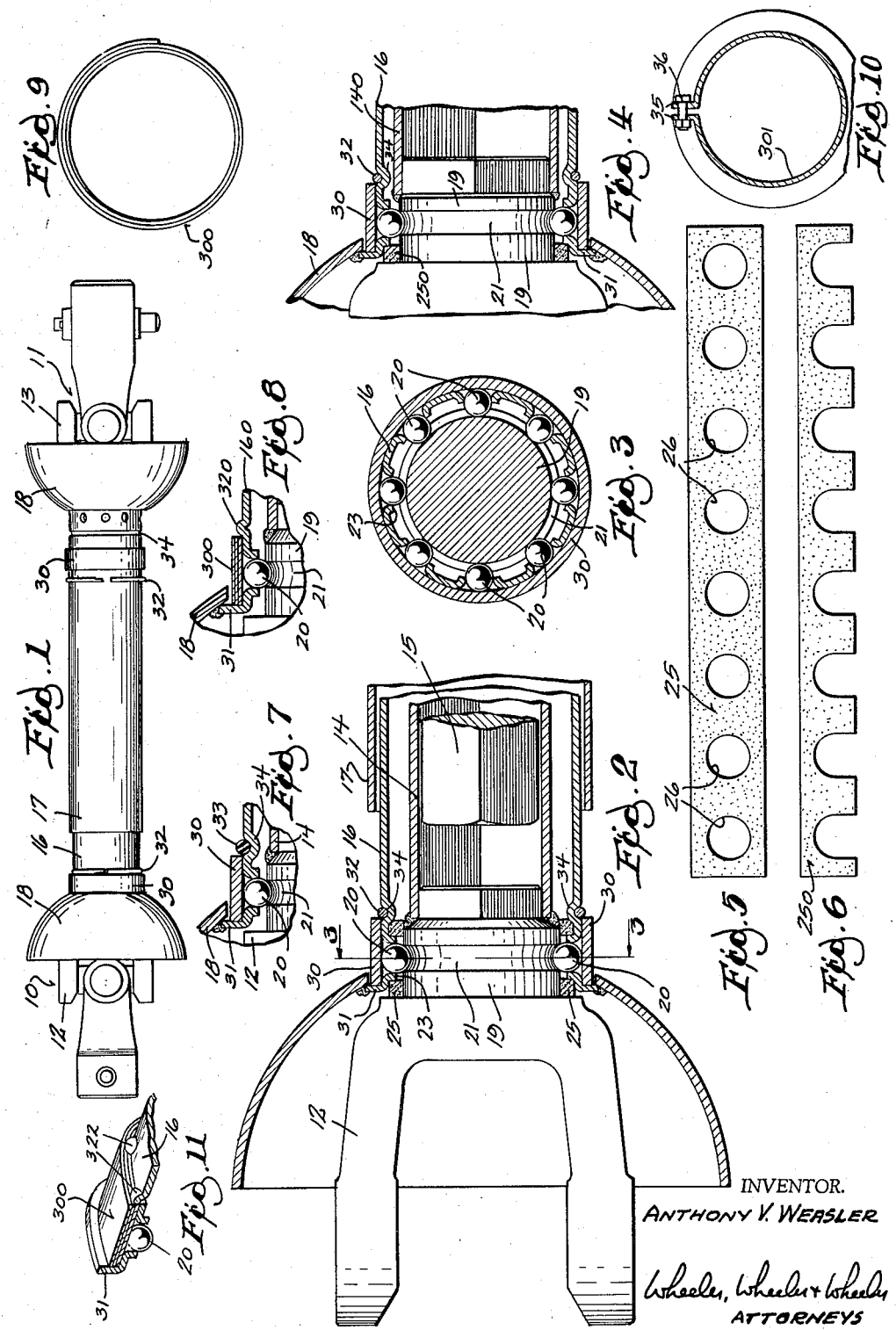

2,919,562

QUICKLY DETACHABLE BEARING RACE AND FREE WHEELING GUARD FOR A UNIVERSALLY AND TELESCOPICALLY JOINTED SHAFT

Anthony V. Weasler, West Bend, Wis.

Application March 11, 1958, Serial No. 720,629

20 Claims. (Cl. 64—4)

This invention relates to a quickly demountable bearing and detachable free wheeling guard for a shaft.

The problem of quickly detaching a guard having non-unitary bearing assemblies is principally concerned with the ease with which the bearings are assembled and disassembled.

The inner race if formed on the enclosed shaft part and the cage or retainer is formed by the guard sleeve itself. The outer race is a separate and readily removable annulus. It may comprise a solid ring slidable axially on the guard but releasably restrained against axial movement. As an alternative embodiment, I have shown a construction in which the outer race comprises a coil of clock spring or a negator or other spring seated in a channel with which the guard sleeve is provided in the zone in which the ball sockets are formed. Instead of a continuous channel, the spring may seat against discontinuous shoulders provided by raised bosses or projections on the guard sleeve or by means of screws, rivets, etc., the spring being radially expansible in order to free it. In another embodiment, the outer race is divided to be clamped about the guard sleeve. Packing is provided in the preferred embodiments of the invention in order that lubrication may be retained in the bearing and dirt and dust kept out.

In the drawings:

Fig. 1 is a plan view of a guarded shaft embodying the invention.

Fig. 2 is a greatly enlarged detail view of one end of the shaft, portions of the telescopically associated shaft sections and the guard being shown in axial section.

Fig. 3 is a view taken in transverse section on the line 3—3 of Fig. 2, packing being omitted.

Fig. 4 is a view similar to Fig. 2 showing a modified embodiment of the invention.

Fig. 5 is a developed plan view of packing used in the device of Figs. 2 and 3.

Fig. 6 is a developed plan view of packing used in the device shown in Fig. 4.

Fig. 7 is an enlarged fragmentary detail view in section of a portion of the device of Fig. 2.

Fig. 8 is a corresponding enlarged detail view in section showing a modified embodiment of the outer race.

Fig. 9 is a view in end elevation of the outer race element shown in Fig. 8.

Fig. 10 is a view in end elevation of a further modified outer race embodiment.

Fig. 11 is a fragmentary perspective view showing a further modified arrangement for releasably confining the outer race element.

The shaft to be guarded comprises a pair of universal joint members 10 and 11 having their yoke portions 12 and 13 respectively connected with telescopically associated shaft members 14 and 15, desirably square in cross section to transmit torque while accommodating relative axial movement.

The guard comprises a pair of telescopically associated sleeves 16, 17 each of which may carry a bell-shaped member 18 at least partially enclosing one of the universal joints to guard the user against accidental contact with the joint.

It is desirable that the components of the guard be mounted from the corresponding components of the shaft without being constrained to rotate with the shaft so that if a user accidentally falls against or otherwise touches the guard, the rotation of the guard will readily be arrested. To this end, the guard is supported on ball bearings such as those shown at 20 and which roll on an inner race, the race channel 21 of shaft member 14 being illustrated by way of example as desirably formed on the hub 19 of the universal joint member 12.

Opposite the race 21 the guard sleeve 16 has inwardly formed flanges 23 providing ball-confining pockets and desirably engaging each ball 20 approximately centrally on its largest diameter or equator as clearly appears both in Fig. 2 and Fig. 3.

For confining lubricant about the balls, and keeping dirt and dust out of the bearing assembly, I desirably employ a strip of packing 25 punched with apertures 26 large enough so that the flanges 23 extend into the apertures as shown in Fig. 2. The packing is such that it will wrap around the cylindrical portion of the inner race for approximately 360° whereby the race is completely enclosed.

The outer race may comprise simply a hard collar 30 slidable externally on the guard sleeve 16 or 17 and anchored between the flange 31 on the end of the guard sleeve and a split ring 32 (Figs. 1 and 2) or an elastomeric O-ring 33 (Fig. 7), the retainer in either case being received in an annular groove 34 rolled, cut or otherwise formed in the guard sleeve 16 or 17 as shown. The outer race collar 30 is shown in operative position on the guard sleeve 16 in Fig. 1 while the collar 30 on the guard sleeve 17 in Fig. 1 has been slid axially away from its operative position to show how easily the device may be disassembled. If the split ring 32 is used as a retainer, its end is desirably beveled as shown in the specimen at the right in Fig. 1 to facilitate getting a screw driver or knife under the end in order to free the retainer from its groove 34. No other tool is required. In this respect, the present device is in sharp contrast with the arrangements commonly used in which the retainer is welded in place or anchored by integral portions.

To assemble the ball bearing, the inner race being greased, and the outer race having been slipped aside along the guard sleeve, the balls are inserted in the sockets provided by the annular flanges 23, the outer race is slipped into position against flange 31 and the retainer applied in groove 34 to complete the assembly.

The difference between the device shown in Figs. 1 and 2 and that shown in Fig. 4, is primarily in the size and construction of the tubular shaft element 140 which, in the Fig. 4 construction, is of larger diameter than the corresponding element of Fig. 2. The welding of the tubular shaft 140 to the universal joint hub 19 does not leave room for the full width of packing strip 25 of Fig. 5 and accordingly a packing 250 of reduced width, as shown in Fig. 6, is employed in the Fig. 4 construction. The packing may be omitted if desired.

In the construction shown in Figs. 8 and 9, the outer race comprises a multiple or single turn clock, negator, or other spring coil 300, which, like the outer race 30, is confined against axial displacement to the left as viewed in Figs. 2 and 8 by abutment with the flange 31. To constrain it from movement to the right, the guard sleeve 160 is formed with a rib 320 instead of a groove 34 and the normally contractile spring race 300 is expanded to pass over the rib 320 into position about the balls 20. Its inherent bias causes it to contract as shown in Fig. 8 after being released between the rib 320 and the flange 31. It offers plenty of resistance to radial thrust sufficient to support the guard. Yet it is easily disassembled for the purpose of removing the guard or replacing the bearings.

Instead of a continuous rib such as that shown at 320, a discontinuous means projecting from the sleeve can be used. In order to make it unnecessary to drill the sleeve to receive rivets, screws or the like, it is preferred that the retaining means be integral with the sleeve. A very practical and successful construction involves peripherally slitting the sleeve at intervals and forming outwardly the metal bounded by each slit at the side thereof opposite the race 300, the resulting projection 322 constituting the race-confining means as clearly shown in Fig. 11.

In the construction of Fig. 10, the outer race comprises a split ring, and any arrangement is acceptable for so sectioning the ring as to make it easily applicable and removable. The device illustrated comprises a band 301 with transverse seats 35 at its ends and a connecting bolt 36 for securing the ends releasably together to constitute the desired outer ring. The seats may comprise transverse flanges and band 301 desirably comprises a channel whose sides give access to the bolt 36 and yet protect the user from being struck by the bolt or its seat in the rotation of the guard. With the ends of the band 301 clamped together, the race is substantially continuous about the balls and is confined in the peripheral channel of the guard sleeve 16 whether such channel be made as shown in Fig. 2, Fig. 7, Fig. 8, Fig. 11, or otherwise. When it is desired to dismount the guard or repair the bearing, the bolt 36 is released or removed and the outer race 301 can thereupon be expanded to free it from the channel on the guard sleeve or, if necessary, removed completely.

It will be noted that in all of these constructions the guard sleeve itself has a diameter which locates it flush with the outer peripheries of the bearing balls so that the outer race supported on the guard sleeve will be properly located to function as a retainer and outer raceway for such balls. Yet the inwardly turned flanges 23 of the guard sleeve which space the balls angularly about the bearing surfaces are desirably of such extent as to engage the balls substantially midway between the races.

The construction is one which not only provides optimum location of the balls and minimum wear but it facilitates guard application and removal, as well as access for ball replacement or lubrication by simply manipulating the outer race on the guard sleeve, with which the race is in substantial peripheral face contact when in use.

In devices of this character now available on the market, the outer race is conventionally welded in position. This requires the use of welding apparatus in the assembly and it requires that the weld be broken and replaced whenever access to the bearing or change of the guard organization is desired. It is important that in the instant device no tools are required for assembly or disassembly other than a screw driver or knife or the like to dislodge the retainer or the race, whereupon the bearing balls are readily removed and the guard sleeves can be slid axially from the shaft member protected thereby.

I claim:

1. In a bearing construction the combination with a peripherally channeled inner race, of an apertured sleeve encircling the race, bearing means in the apertures of the sleeve and in the peripheral channel of the inner race and located thereby, an outer race peripherally encircling and axially slidable upon the sleeve and in registry with and in operative bearing contact with the means and means for detachably locating the outer race in registry with the means, the outer race being readily movable axially along the sleeve to and from registry with the means.

2. In a bearing construction the combination with an inner race, of an apertured sleeve encircling the race, bearing means in the apertures of the sleeve and located thereby, an outer race peripherally encircling the sleeve and in operative bearing contact with the bearing means, and means for detachably locating the outer race respecting the bearing means, the outer race being readily movable to and from registry with the bearing means said sleeve having flanges about its said apertures in which bearing means are disposed, said flanges extending approximately to the mid point of the bearing means to engage the bearing means substantially intermediate the races.

3. The device of claim 2 in which the interior surface of each flange merges curvilinearly with the exterior surface of the sleeve, the cross section enclosed by respective flanges decreasing from the exterior surface of the sleeve toward the level at which the respective flanges engage the bearing means positioned thereby.

4. In a bearing construction the combination with an inner race, of an apertured sleeve encircling the race, bearing means in the apertures of the sleeve and located thereby, an outer race peripherally encircling the sleeve and in operative bearing contact with the bearing means, and means for detachably locating the outer race respecting the bearing means, the outer race being readily movable to and from registry with the bearing means the outer race being substantially in peripheral face contact with the sleeve.

5. The device of claim 4 in which said sleeve has a peripheral groove adjacent the slidable outer race and a quickly removable expansible retainer in the groove confining the outer race against axial displacement, said sleeve having at the other side of the outer race from said groove a relatively fixed means by which the outer race is confined.

6. The device of claim 5 in which the expansible retainer comprises an elastomeric ring.

7. The device of claim 5 in which the expansible retainer comprises a resilient split ring.

8. The device of claim 4 in which the outer race has free end portions relatively separable to expand the outer race, the said sleeve having race-confining means from which the outer race may be freed when its said end portions are separated.

9. The device of claim 8 in which the race-confining means comprises a plurality of stop means spaced about the sleeve circumferentially thereof and abutted marginally by the outer race.

10. The device of claim 8 in which the race-confining means is integral with the sleeve.

11. The device of claim 8 in which the race-confining means comprises an integral portion of the sleeve deformed convexly outwardly and bounded by a short circumferential slit with which the sleeve is provided.

12. The device of claim 8 in which the outer race comprises a spring having inherent contractile bias for maintaining it in engagement with said sleeve within said means.

13. The device of claim 8 in which said outer race comprises a split ring having means for detachably connecting its ends to close said ring about said sleeve in abutment with said means.

14. The combination with a universally jointed shaft including a universal joint yoke having a hub portion constituting a bearing race, a guard sleeve enclosing a portion of said shaft and extending over said race and provided with ball-receiving apertures, balls in the apertures engaged with the race, and a removable outer race member in peripheral contact with said sleeve and spanning the ball-receiving apertures and against which the said balls bear.

15. The combination set forth in claim 14 in which the guard sleeve has inwardly formed integral flanges about the ball-receiving apertures, said flanges having ball-locating circular surfaces engaging respective balls between said races.

16. The device of claim 15 in which the circular surfaces are generally conical and convergent to a level of ball engagement which is substantially diametrical of the ball.

17. The combination set forth in claim 14 in which the outer race comprises a collar of fixed radius, the sleeve having an integral portion precluding movement of said collar in one direction from registry with the balls, and freely removable means connected with the sleeve for precluding movement of the collar in the opposite direction from registry with said balls, the collar being freely slidable along the sleeve out of registration with said balls to expose the balls when said last mentioned means is removed.

18. The combination set forth in claim 17 in which the sleeve has a groove, the said removable means comprising a radially expansible stop normally seated in said groove and disengaged from the groove upon expansion.

19. The device of claim 14 in which the guard sleeve has race-confining means at both sides of the outer race, said outer race comprising a radially expansible member adapted when expanded to clear said means at one side for relative movement axially of the sleeve.

20. The device of claim 19 in which said outer race has separable ends and the confining means cleared by the outer race upon separation of said ends comprises circumferentially spaced outwardly embossed portions of said sleeve.

References Cited in the file of this patent

UNITED STATES PATENTS

| | | |
|---|---|---|
| 1,922,151 | Boice et al. | Aug. 15, 1933 |
| 2,146,663 | Vaughn | Feb. 7, 1939 |
| 2,772,549 | Harrington | Dec. 4, 1956 |
| 2,785,549 | Harrington | Mar. 19, 1957 |
| 2,796,749 | Warner | June 25, 1957 |